(12) United States Patent
Zhang et al.

(10) Patent No.: US 9,965,089 B2
(45) Date of Patent: May 8, 2018

(54) TOUCH SUBSTRATE AND METHOD OF MANUFACTURING THE SAME, AND DISPLAY DEVICE

(71) Applicants: BOE Technology Group Co., Ltd., Beijing (CN); Hefei Xinsheng Optoelectronics Technology Co., Ltd., Anhui (CN)

(72) Inventors: Lei Zhang, Beijing (CN); Yubo Xu, Beijing (CN); Ming Hu, Beijing (CN); Taofeng Xie, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 23 days.

(21) Appl. No.: 15/037,453

(22) PCT Filed: Sep. 11, 2015

(86) PCT No.: PCT/CN2015/089435
§ 371 (c)(1),
(2) Date: May 18, 2016

(87) PCT Pub. No.: WO2016/183971
PCT Pub. Date: Nov. 24, 2016

(65) Prior Publication Data
US 2017/0108975 A1 Apr. 20, 2017

(30) Foreign Application Priority Data
May 18, 2015 (CN) .......................... 2015 1 0252881

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 2203/04103* (2013.01); *G06F 2203/04111* (2013.01); *G06F 2203/04112* (2013.01)

(58) Field of Classification Search
None
See application file for complete search history.

(56) References Cited

U.S. PATENT DOCUMENTS

2012/0218221 A1 8/2012 Igeta
2013/0265274 A1 10/2013 Liu et al.

FOREIGN PATENT DOCUMENTS

| CN | 102043548 A | 5/2011 |
| CN | 103955320 | 7/2014 |

(Continued)

OTHER PUBLICATIONS

First Office Action, including Search Report, for Chinese Patent Application No. 201510252881.0, dated May 17, 2017, 13 pages.

(Continued)

*Primary Examiner* — Kenneth B Lee, Jr.
(74) *Attorney, Agent, or Firm* — Westman, Champlin & Koehler, P.A.

(57) ABSTRACT

A touch substrate is disclosed. The touch substrate comprises: a base substrate; a plurality of first electrode chains, each first electrode chain comprising a plurality of drive electrodes; a plurality of second electrode chains, each second electrode chain comprising a plurality of sensing electrodes, the plurality of second electrode chains and the plurality of first electrode chains crossing each other, and gaps being formed between adjacent drive and sensing electrodes; a plurality of first conductor structures, each being arranged within one corresponding gap and electrically insulated from the first and second electrodes; and a plurality of second conductor structures, each being pro- (Continued)

vided in a central region of a corresponding sensing electrode and electrically insulated from the sensing electrode. A method of manufacturing the touch substrate and a display device comprising the touch substrate are also disclosed.

18 Claims, 4 Drawing Sheets

(56) References Cited

FOREIGN PATENT DOCUMENTS

| CN | 203588229 | 5/2015 |
|----|-----------|--------|
| CN | 104793833 | 7/2015 |
| KR | 10-2012-0069234 A | 6/2012 |
| TW | 201409296 A | 3/2014 |

OTHER PUBLICATIONS

International Search Report and Written Opinion for International Application No. PCT/CN2015/089435, dated Feb. 2, 2016.
English translation of Box No. V from the Written Opinion of the International Searching Authority for International Application No. PCT/CN2015/089435, dated Feb. 2, 2016.

TOUCH SUBSTRATE AND METHOD OF MANUFACTURING THE SAME, AND DISPLAY DEVICE

CROSS-REFERENCE TO RELATED APPLICATION

This application is a Section 371 National Stage Application of International Application No. PCT/CN2015/089435, filed on Sep. 11, 2015, entitled "Touch Substrate and Method of Manufacturing the same, and Display Device", which has not yet been published, and which claims priority to Chinese Application No. 201510252881.0, filed on 18 May 2015, incorporated herein by reference in their entirety.

TECHNICAL FIELD

Embodiments of the present disclosure generally relate to the field of touch display technologies, and particularly, to a touch substrate and a method of manufacturing the same, and a display device comprising the touch substrate.

BACKGROUND

Touch panels may comprise resistance-type touch panels and capacitance-type touch panels based on principles of operation. Currently, capacitance-type touch panels are increasingly applied in electronic products. A capacitance-type touch panel operates based on current induction between the touch panel and a human body, that is, capacitance-type touch panel is a touch panel in which a touch signal is generated through a combination of characteristics of electrode(s) and a human body. When a human body (finger) touches a screen of a touch panel, a coupling capacitance will be formed between the finger and a conductor layer of the touch panel under an electric field from the human body, such that a current will be generated and flow from the electrode of the touch panel to the touch point, thereby the position of the touch point can be calculated accurately.

The existing touch panel, however, is relatively onefold in structure, and its capacitance Cm is not compatible with a capacitance value of available touch drive chips, resulting in a great barrier to application of such touch panel. Especially, touch IC (Integrated Circuit) manufacturers have their own patents regarding patterns of touch electrodes due to their earlier planning schemes and their own ICs bound with the patents. If a TP company manufactures dies and produces TPs by using ICs and patterns of touch electrodes from A company, and thereafter due to some reasons, the company needs to use ICs from B company instead of the ICs from A company, the dies previously manufactured cannot be used anymore due to the patents, even if the ICs from B company may also normally match with the patterns of touch electrodes from A company, and new dies need to be manufactured using the patterns of touch electrodes from B company, which will result in a great loss for the TP company.

SUMMARY

The present disclosure is made to overcome at least one of the above mentioned and other problems and disadvantages in prior arts.

According to an aspect of the present disclosure, there is provided a touch substrate, comprising:
a base substrate;
a plurality of first electrode chains spaced apart from one another and arranged on the base substrate, each first electrode chain comprising a plurality of first electrodes;
a plurality of second electrode chains spaced apart from one another and arranged on the base substrate, each second electrode chain comprising a plurality of second electrodes, the plurality of second electrode chains and the plurality of first electrode chains being arranged to cross each other, the first electrodes and the second electrodes being electrically insulated from each other, and gaps being formed between adjacent first and second electrodes; and
a plurality of first conductor structures, each first conductor structure being arranged within one corresponding gap and electrically insulated from the first and second electrodes.

In the above touch substrate, the first conductor structure may comprise a hollowed-out structure.

In the above touch substrate, the hollowed-out structure may comprise a plurality of grids defined by conductive traces.

In the above touch substrate, the first electrodes, the second electrodes and the first conductor structures may be located in the same layer and made of the same material.

In the above touch substrate, the first electrodes and the first conductor structures may be located in a first layer and are made of the same material, and the second electrodes may be located in a second layer different from the first layer.

In the above touch substrate, each grid may comprise an enclosed or incompletely enclosed structure.

In the above touch substrate, the first electrodes and the second electrodes each may have a diamond or square shape, adjacent first electrodes are electrically connected with each other at vertexes of the diamond or square shapes along a first direction, and adjacent second electrodes are electrically connected with each other by a bridging structure at vertexes of the diamond or square shapes along a second direction.

In the above touch substrate, each first electrode and/or each second electrode may have a plate structure made of a transparent conductive material or a mesh structure made of a metal material.

In the above touch substrate, one of the first electrode and the second electrode is a drive electrode and the other one is a sensing electrode, and a hollowed-out second conductor structure is provided in a center region of the sensing electrode and electrically insulated from the sensing electrode.

In the above touch substrate, the second conductor structure may be made of the same material as that of the first conductor structure.

In the above touch substrate, shapes of adjacent second conductor structures may be different from each other.

In the above touch substrate, a ratio of an area occupied by each second conductor structure to an area of a corresponding sensing electrode provided with the second conductor structure may be in a range from 0.2 to 0.45. Preferably, the sensing electrode may have a square shape, a length of a diagonal line of the square shape is P, a distance between one side of the sensing electrode and an outmost side of the second conductor structure provided within the sensing electrode is B, and: B is in a range from 0.55 mm to 0.83 mm when 4 mm>P≥3 mm; B is in a range from 0.07 mm to 1.1 mm when 5 mm>P≥4 mm; B is in a range from 0.8 mm to 1.2 mm when 6 mm>P≥5 mm; and B is in a range from 1.02 mm to 1.54 mm when 7 mm>P≥6 mm.

In the above touch substrate, a ratio of an area of each first conductor structure to an area of the first electrode or the second electrode may be in a range from 0.045 to 0.11. Preferably, the first conductor structure has a length along the gap between adjacent first and second electrodes and a width perpendicular to a direction of the length, each of the first electrode and the second electrode has a square shape, and if a length of a diagonal line of the square shape is P and the width of the square shape is A, then: A is in a range from 0.15 mm to 0.23 mm when 4 mm>P≥3 mm; A is in a range from 0.22 mm to 0.32 mm when 5 mm>P≥4 mm; A is in a range from 0.27 mm to 0.41 mm when 6 mm>P≥5 mm; and A is in a range from 0.33 mm to 0.49 mm when 7 mm>P≥6 mm.

In the above touch substrate, a capacitance formed between adjacent first and second electrodes may be in a range from 1.2 PF to 1.6 PF.

According to another aspect of the present disclosure, there is provided a display device comprising any touch substrate as described above.

According to a further aspect of the present disclosure, there is provided a method of manufacturing a touch substrate, comprising:

forming a plurality of first electrode chains spaced apart from one another and a plurality of second electrode chains spaced apart from one another on a base substrate, each first electrode chain comprising a plurality of first electrodes, each second electrode chain comprising a plurality of second electrodes, the plurality of second electrode chains and the plurality of first electrode chains being arranged to cross each other, the first electrodes and the second electrodes being electrically insulated from each other, and gaps being formed between adjacent first and second electrodes; and forming a first conductor structure within each gap from a conductive material such that the first conductor structure is electrically insulated from the first and second electrodes.

In the above method, the first electrode chains, the second electrode chains and the first conductor structures may be formed at the same time.

In the above method, forming the first electrode chains, the second electrode chains and the first conductor structures at the same time may comprise:

forming a first conductive material layer on the base substrate;

patterning the first conductive material layer to form a pattern including the first electrode chains, the second electrode chains and the first conductor structures, such that the plurality of first electrodes of each first electrode chain are electrically connected with one another successively;

forming an insulating layer covering the pattern on the base substrate;

forming through holes corresponding to each second electrode respectively in the insulating layer; and forming a second conductive material layer on the insulating layer such that the through holes are filled with the second conductive material layer, and patterning the second conductive material layer to form bridging structures each electrically connecting two adjacent second electrodes of one second electrode chain, such that the plurality of second electrodes of each second electrode chain are electrically connected with one another successively.

When one of the first electrode and the second electrode is configured as a drive electrode and the other one is configured as a sensing electrode, the method may further comprise forming a second conductor structure from a conductive material in a center region of a corresponding sensing electrode such that the second conductor structure is electrically insulated from the corresponding sensing electrode.

In the above method, shapes of adjacent second conductor structures may be formed to be different from each other.

Other objects and advantages of the disclosure will become more obvious through following detailed description of the present disclosure made with reference to the attached drawings, which help comprehensive understanding of the present disclosure.

BRIEF DESCRIPTION OF THE DRAWINGS

Features and advantages of the disclosure will be more clearly understood with reference to the attached drawings, which are illustrative and should not be construed as a limit to the disclosure, and in which.

DETAILED DESCRIPTION OF PREFERRED EMBODIMENTS

In the following detailed description, numerous specific details are set forth in order to provide a thorough understanding of the disclosed embodiments. It will be apparent, however, that the present disclosure may be practiced with other embodiments different from those described herein. Thus, scopes of the present disclosure are not limited by the following disclosed exemplary embodiments.

Figure 1:
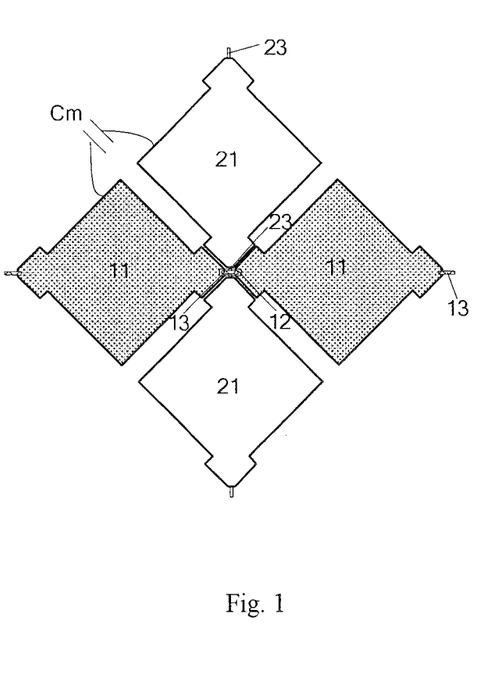
FIG. 1 is a structural schematic diagram showing an example of an arrangement of a pattern of touch electrode of an existing touch panel.

FIG. 1 shows an example of a pattern of touch electrodes. A touch panel (TP) comprises a plurality of first electrodes 11 and a plurality of second electrodes 21 arranged alternately, the first electrodes 11 and the second electrodes 21 are electrically insulated from each other, a column of a plurality of second electrodes 21 may be electrically connected with one another successively, for example, through conductive connection structures 23, and a row of a plurality of first electrodes 11 may be electrically connected with one another successively, for example, through bridging structures. Each bridging structure comprises an insulating layer 12 covering the conductive connection structure 23 and a conductive connection structure 13 formed on the insulating layer 12 and electrically connecting adjacent first electrodes 11 in same row with each other. As can be seen from FIG. 1, a capacitance Cm exists between a first electrode 11 and an adjacent second electrode 21, so when a human body (finger) touches the screen of the touch panel, a coupling capacitance will be formed between the finger and a conductor layer of the touch panel under an electric field from the human body, resulting in a change in the capacitance Cm, from which a position of the touch can be calculated.

Figure 2:
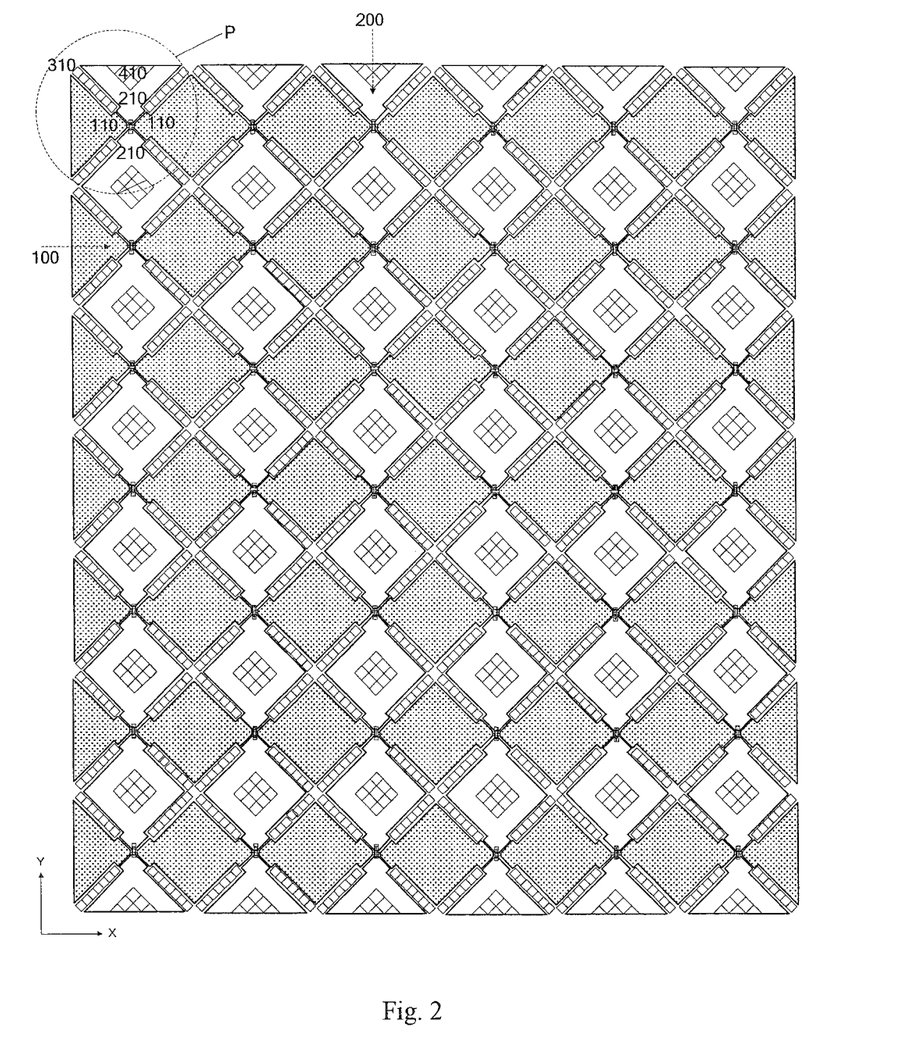
FIG. 2 is a structural schematic diagram showing a touch substrate according to an exemplary embodiment of the present disclosure.
Figure 3:
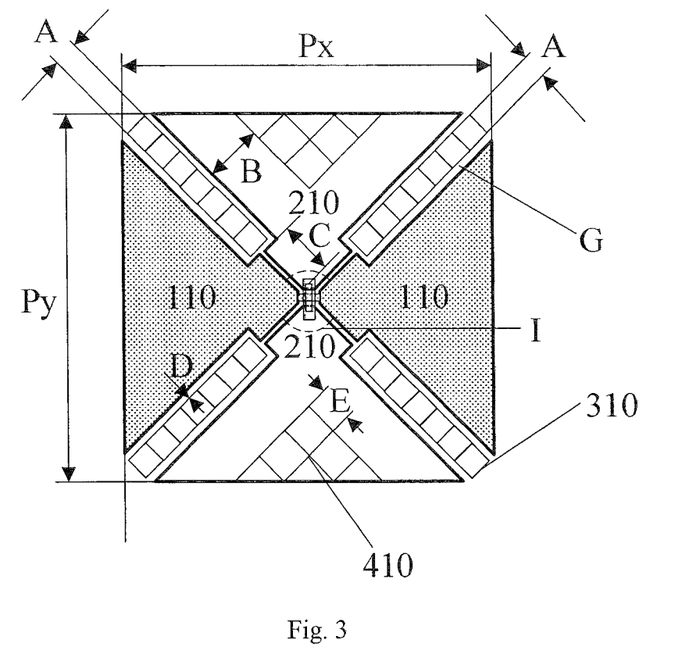
FIG. 3 is a partially enlarged viewing of a broken circle "P" shown in FIG. 2, showing a pattern of touch electrodes of the touch substrate.

FIG. 2 shows an arrangement of touch electrodes of a touch substrate according to an exemplary embodiment of the present disclosure, and FIG. 3 is a partially enlarged drawing of a portion of FIG. 2 indicated by a circle "P" formed of broken line, showing a pattern of touch electrodes of the touch substrate. In the embodiment shown in FIG. 2, the touch substrate comprises a base substrate, and a plurality of first electrode chains 100 and a plurality of second electrode chains 200 arranged on the base substrate crossing each other (for example, perpendicularly crossing each other, but the present disclosure is not limited thereto), so as to form an array. The plurality of first electrode chains 100 may be spaced apart from one another in a column direction (e.g., Y-axis direction) of the array, for example, the first electrode chains are arranged in parallel with one another, and the plurality of second electrode chains 200 may be spaced apart from one another in a row direction (e.g., X-axis direction) of the array, and preferably, the second electrode chains are arranged in parallel with one another. Each first electrode chain 100 may comprise a plurality of first electrodes 110 that may be arranged, for example, in the row direction; each second electrode chain 200 may comprise a plurality of second electrodes 210 that may be arranged, for example, in the column direction.

In an example, the plurality of first electrodes 110 of each first electrode chain 100 may be electrically connected with each other successively, and the plurality of second electrodes 210 of each second electrode chain 200 may also be electrically connected with each other successively. The present disclosure, however, is not limited thereto; for example, whether or not the plurality of first electrodes of each first electrode chain are electrically connected with each other and/or the plurality of second electrodes of each second electrode chain are electrically connected with each other can be determined based on a driving mode for a touch panel.

Figure 4:
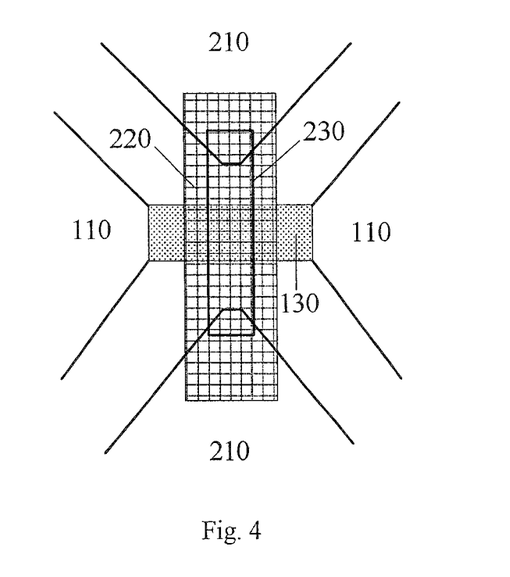
FIG. 4 is an enlarged view of a part "I" shown in FIG. 3.

As shown in FIGS. 3 and 4, two adjacent first electrodes 110 of each first electrode chain 100 may be electrically connected with each other directly, or via a conductive structure 130, and two adjacent second electrodes 210 of each second electrode chain 200 may be electrically connected with each other via a bridging structure. In an example, the bridging structure comprises an insulating layer 220 across the conductive structure 130 and a conductive structure 230 disposed on the insulating layer 220, and the two adjacent second electrodes 210 of each second electrode chain 200 are electrically connected by the conductive structure 230.

The first electrodes 110 and the second electrodes 210 are electrically insulated from each other, and a gap G exists between a first electrode 110 and an adjacent second electrode 210, as shown in FIG. 3, and thereby a capacitance is formed between the first electrode 110 and the adjacent second electrode 210. In an example, one of the first electrode 110 and the second electrode 210 is a drive electrode, while the other one is a sensing electrode, such that when a drive voltage is applied to the drive electrode and a touch action is applied on the touch panel, the capacitance between adjacent first electrode 110 and second electrode 210 near the touch point is changed. The change of the capacitance is sensed by the sensing electrode, and thereby a position of the touch can be determined.

The first electrode 110 and the second electrode 210 may be made of various conductive materials, such as a transparent conductive material or a metal material, and may be formed into various shapes, such as a diamond shape, a square shape, a rectangular shape or like, which are not particularly limited in the present disclosure. In an example, the first electrode 110 and/or second electrode 210 may have a plate structure formed of a transparent conductive material, or have a mesh structure formed of a metal material. In a preferred embodiment, where the first electrode and the second electrode have a diamond or square shape, adjacent first electrodes 110 of each first electrode chain 100 are electrically connected with each other at a vertex of the diamond or square shape in the row direction, and adjacent second electrodes 210 of each second electrode chain 200 are electrically connected with each other by the abovementioned bridging structure at a vertex of the diamond or square shape in the column direction.

According to embodiments of the present disclosure, the touch substrate further comprises a plurality of first conductor structures 310 spaced apart from one another, as shown in FIGS. 2 and 3, each first conductor structure 310 is arranged between adjacent first electrode 110 and second electrode 210, that is, within one corresponding gap G, and is formed of a conductive material and electrically insulated from the first electrode 110 and the second electrode 210. Each first conductor structure may extend a substantially full length of the corresponding gap while being spaced apart or electrically insulated from the first and second electrodes.

According to embodiments of the present disclosure, through adjusting sizes or structural parameters of the first conductor structure, the capacitance between the adjacent first electrode and second electrode may be adjusted to match with a capacitance value compatible with a desired touch drive chip. For example, the first conductor structure is appropriately designed such that the capacitance formed between the adjacent first electrode and second electrode is 1.2 PF to 1.6 PF, which matches with a capacitance value (generally, from 1 to 3 PF) compatible with an available touch IC, thereby obtaining a better touch effect. A size of a touch electrode varies as a size of a touch panel or touch screen product varies, appropriate capacitance values may be obtained by adjusting the sizes or structural parameters of the first conductor structure so as to be applicable in touch panels of various sizes. Further, the first conductor structure arranged within the gap between the adjacent first electrode and second electrode can reduce an adverse effects caused by fringe field effects, and avoid a problem of the touch panel being only sensitive to a touch action near a position where the first and second electrodes are crossed, such that a touch action applied at any position on the electrodes will result in a change in capacitance between electrodes, thereby improving the sensitivity of the touch panel. In addition, although portions of the touch panel where the first and second electrodes are arranged are transparent, illuminance of light will still be reduced due to arrangement of the first and second electrodes; the arrangement of the first conductor structures may reduce the illuminance in regions of the gaps, so that the brightness of the touch panel is homogeneous, and display effects is improved.

In an example, as shown in FIGS. 2 and 3, the first conductor structure 310 may comprise a hollowed-out structure, which may reduce adverse influence on display effects and reduce electrostatic effect. For example, the hollowed-out structure may comprise a plurality of grids square frames defined by conductive traces, and each grid may have an enclosed or incompletely enclosed structure. In an example, the first electrodes 110, the second electrodes 210 and the first conductor structures 310 may be located in the same layer on the base substrate and may be made of the same material, for example, the same transparent conductive material or metal material layer, such that they may be formed at the same time through one patterning process, and manufacturing processes can be simplified. In an alternative example, the first conductor structures 310 and one of the first electrodes 110 and the second electrodes 210 are located in a first layer on the base substrate and may be made of the same material, and the other one of the first electrodes 110 and the second electrodes 210 are located in a second layer different from the first layer, thereby omitting the bridging structure as described above.

According to another exemplary embodiment of the present disclosure, when one of the first electrode and the second electrode is a drive electrode while the other is a sensing electrode, for example, when first electrode 110 is a drive electrode while the second electrode 210 is a sensing electrode, a second conductor structure 410 may be provided in a center region of the sensing electrode and electrically insulated from the sensing electrode. The second conductor structure 410 may also have a hollowed-out structure. The hollowed-out second conductor structure may avoid a problem of a touch action applied at a position within the center region of the sensing electrode being not easily to be sensed, improve sensitivity of the sensing electrode, and reduce interferences caused by, for example, external noises such as electrostatic.

In an example, the second conductor structure 410 may be made of the same material as that of the first conductor structure 310, preferably made of the same material as those of the electrodes, so as to simplify manufacturing processes. In another example, shapes or sizes of adjacent second conductor structures are different from each other such that no regular pattern will be formed by the second conductor structures to affect image display, thereby improving visual uniformity.

FIG. 3 shows an exemplary arrangement of the first electrodes 110, the second electrodes 210, the first conductor structures 310 and the second conductor structure 410, and parameters associated with the arrangement. In the example shown in FIG. 3, the first electrode 110 and the second electrode 210 each have a square shape, which may comprise a hollowed-out structure comprising a plurality of grids or square frames defined by conductive traces. The length of a diagonal line of the square shape is P (e.g., Px, Py), and preferably, the first electrode 110 and the second electrode 210 have the same shape, that is Px=Py; the value of P is associated with the size of the touch panel and the arrangement of the electrodes. Generally, for a TP manufacturer, a value of P of an electrode corresponding to a touch panel having certain sizes has a fixed range or is preset in order to reduce cost of manufacturing masks. Each first conductor structure 310 has a width A extending between adjacent first electrode 110 and second electrode 210, and the width A may be adjusted for a touch panel having certain sizes, so as to obtain an optimized capacitance to match with a capacitance value compatible with a touch drive chip; a distance between one side of each sensing electrode and an outmost side of a second conductor structure 410 provided within the sensing electrode is B, and the value of B may be adjusted to optimize noise reduction effect; a connection of the first electrodes 110 and a connection of the second electrodes 210 has an intersection point, and a narrowed gap part having a length of C is formed between the intersection point and an adjacent gap G formed between adjacent first and second electrodes; a line width of the conductive traces defining the grids or square frames of the hollowed-out structure of an electrode is D, and a length/width of the grids or square frames is E.

For touch panel or touch screen products having different sizes, the present inventor(s) has made adjustments and optimizations to the above parameters, so as to obtain an optimized capacitance to match with a capacitance value compatible with a touch drive chip. In an example, an optimized capacitance formed between adjacent first and second electrodes is 1.2 PF to 1.6 PF, which matches with the capacitance value (generally, 1 to 3 PF) compatible with the available touch IC, thereby enabling better touch effects. For example, a ratio of an area of a first conductor structure to an area of a first or second electrode may be in a range from 0.045 to 0.11, and a ratio of an area occupied by a second conductor structure to an area of a corresponding sensing electrode may be in a range from 0.2 to 0.45. The following table 1 has provided optimized parameters according to an example.

TABLE 1

| P(mm) | A(mm) | B(mm) | C(mm) | D(mm) | E(mm) |
|---|---|---|---|---|---|
| 4 > Px(Py) ≥ 3 | 0.15~0.23 | 0.55~0.83 | 0.5 | 0.03 | ≈A |
| 5 > Px(Py)4 | 0.22~0.32 | 0.07~1.1 | | | |
| 6 > Px(Py) ≥ 5 | 0.27~0.41 | 0.8~1.2 | | | |
| 7 > x(Py) ≥ 6 | 0.33~0.49 | 1.02~1.54 | | | |
| Notes | Item that can be adjusted | Item that can be adjusted | Commonly used value | Depending on photolithography process | |

Figure 5:
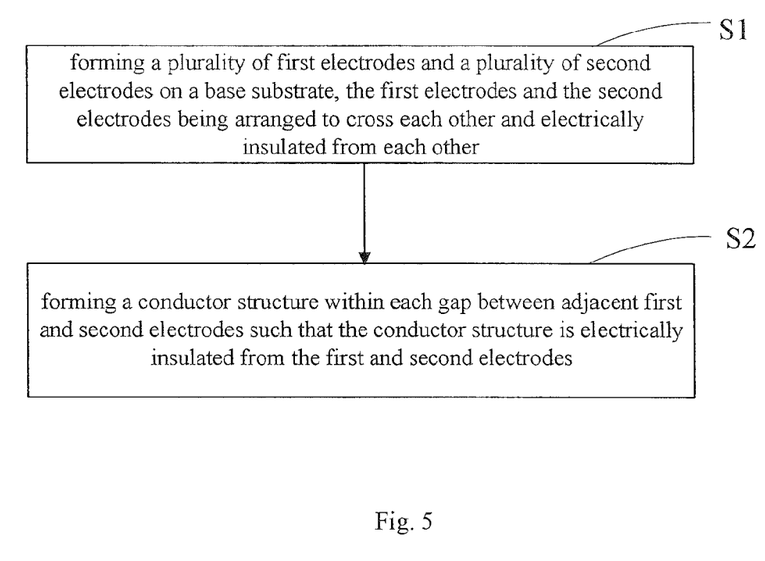
FIG. 5 is a flowchart of a method of manufacturing a touch substrate according to another exemplary embodiment of the present disclosure.

In another exemplary embodiment of the present disclosure, there is provided a method of manufacturing the touch substrate as described above, and as shown in the flowchart of FIG. 5, the method mainly comprises following steps:

S1: forming a plurality of first electrode chains spaced apart from one another and a plurality of second electrode chains spaced apart from one another on a base substrate, each first electrode chain comprising a plurality of first electrodes, each second electrode chain comprising a plurality of second electrodes, the plurality of second electrode chains and the plurality of first electrode chains being arranged to cross each other, the first electrodes and the second electrodes being electrically insulated from each other, and gaps being formed between adjacent first and second electrodes; and S2: forming a first conductor structure within each gap from a conductive material such that the first conductor structure is electrically insulated from the first and second electrodes.

In an example, in the above method of manufacturing the touch substrate, the above steps S1 and S2 may be performed in one step so as to form the first electrode chains, the second electrode chains and the first conductor structures at the same time. Exemplarily, the step of forming the first electrode chains, the second electrode chains and the first conductor structures at the same time may comprise:

forming a first conductive material layer, such as a transparent material layer or a thin metal layer, on the base substrate; and patterning the first conductive material layer to form a pattern including the first electrode chains, the second electrode chains and the first conductor structures, such that the plurality of first electrodes of each first electrode chain are electrically connected with each other successively.

After formation of the pattern, an insulating layer covering the pattern may be formed on the base substrate, and through holes corresponding to each second electrode respectively may be formed in the insulating layer. In the case that each second electrode is formed in a diamond or square shape, the through hole may be formed in the insulating layer at a position corresponding to a vertex of the shape. Then, a second conductive material layer is formed on the insulating layer such that the through holes are filled with the second conductive material layer, and the second conductive material layer is patterned to form bridging structures each electrically connecting two adjacent second electrodes of one second electrode chain, such that the plurality of second electrodes of each second electrode chain are electrically connected with each other successively. In this circumstance, the formed first electrodes, second electrodes and first conductor structures are located in the same layer on the base substrate. On the other hand, the electrodes may be arranged in different layers, such that the first electrodes and the second electrodes are formed in different layers respectively, and the first conductor structures may be selectively formed in the same layer as the first electrode or the second electrode.

It will be understood that the first electrodes and the second electrodes may be made of various conductive materials, such as transparent conductive materials or metal materials, and may be formed into various shapes, such as a diamond shape, a square shape, a rectangular shape or the like, which are not particularly limited in the present disclosure. In an example, the first electrode and/or the second electrode may have a plate structure made of a transparent conductive material, or a mesh structure made of a metal material.

In another example, when one of the first electrode and the second electrode is used as a drive electrode and the other one is used as a sensing electrode, the above method may further comprise forming a second conductor structure from a conductive material in a center region of a corresponding sensing electrode such that the second conductor structure is electrically insulated from the corresponding sensing electrode. The second conductor structures may be formed within some or all of the sensing electrodes. In an example, shapes of adjacent second conductor structures may be formed to be different from each other. In a preferred embodiment, the first conductor structure and/or second conductor structure may comprise a hollowed-out structure to reduce adverse influence on the display effects. For example, the hollowed-out structure may comprise a plurality of grids or square frames defined by conductive traces.

Further, embodiments of the present disclosure also provided a display device, comprising the touch substrate as described above or the touch substrate manufactured by the above method. The display device may comprise a liquid crystal display device, such as a liquid crystal television, a mobile phone, an electronic book, a tablet computer or the like.

Although several exemplary embodiments of the present disclosure have been shown and described, it would be appreciated by those skilled in the art that various changes or modifications may be made in these embodiments without departing from the principles and spirit of the present disclosure, the scope of which is defined in the claims and their equivalents.

What is claimed is:

1. A touch substrate, comprising:
a base substrate;
a plurality of first electrode chains spaced apart from one another and arranged on the base substrate, each first electrode chain comprising a plurality of first electrodes;
a plurality of second electrode chains spaced apart from one another and arranged on the base substrate, each second electrode chain comprising a plurality of second electrodes, the plurality of second electrode chains and the plurality of first electrode chains being arranged to cross each other, the first electrodes and the second electrodes being electrically insulated from each other, and gaps being formed between adjacent first and second electrodes, the first electrodes being drive electrodes and the second electrodes being sensing electrodes;
a plurality of first conductor structures, each first conductor structure being arranged within one corresponding gap and electrically insulated from the first and second electrodes: and
a plurality of second conductor structures, each second conductor structure being provided in a central region of a corresponding sensing electrode and electrically insulated from the sensing electrode.

2. The touch substrate according to claim 1, wherein the first conductor structure comprises a hollowed-out structure.

3. The touch substrate according to claim 2, wherein the hollowed-out structure comprises a plurality of grids defined by conductive traces.

4. The touch substrate according to claim 1, wherein the first electrodes, the second electrodes and the first conductor structures are located in the same layer and are made of the same material.

5. The touch substrate according to claim 1, wherein the first electrodes and the first conductor structures are located in a first layer and are made of the same material, and the second electrodes are located in a second layer different from the first layer.

6. The touch substrate according to claim 3, wherein each grid comprises an enclosed or incompletely enclosed structure.

7. The touch substrate according to claim 1, wherein the first electrodes and the second electrodes each have a diamond or square shape, adjacent first electrodes are electrically connected with each other at vertexes of the diamond or square shapes along a first direction, and adjacent second electrodes are electrically connected with each other by a bridging structure at vertexes of the diamond or square shapes along a second direction.

8. The touch substrate according to claim 1, wherein each first electrode and/or each second electrode has a plate structure made of a transparent conductive material or a mesh structure made of a metal material.

9. The touch substrate according to claim 1, wherein the second conductor structure is made of the same material as that of the first conductor structure.

10. The touch substrate according to claim 1, wherein shapes of adjacent second conductor structures are different from each other.

11. The touch substrate according to claim 1, wherein a ratio of an area occupied by each second conductor structure to an area of a corresponding sensing electrode provided with the second conductor structure is in a range from 0.2 to 0.45.

12. The touch substrate according to claim 11, wherein the sensing electrode has a square shape, a length of a diagonal line of the square shape is P, a distance between one side of the sensing electrode and an outmost side of the second conductor structure provided within the sensing electrode is B, and B is in a range from 0.55 mm to 0.83 mm when 4 mm>P≥3 mm;
B is in a range from 0.07 mm to 1.1 mm when 5 mm>P≥4 mm;
B is in a range from 0.8 mm to 1.2 mm when 6 mm>P≥5 mm; and B is in a range from 1.02 mm to 1.54 mm when 7 mm>P≥6 mm.

13. The touch substrate according to claim 1, wherein a ratio of an area of each first conductor structure to an area of the first electrode or the second electrode is in a range from 0.045 to 0.11.

14. The touch substrate according to claim 13, wherein the first conductor structure has a length along the gap between adjacent first and second electrodes and a width perpendicular to a direction of the length, each of the first electrode and the second electrode has a square shape, and if a length of a diagonal line of the square shape is P and the width of the square shape is A, then:

A is in a range from 0.15 mm to 0.23 mm when 4 mm>P≥3 mm;

A is in a range from 0.22 mm to 0.32 mm when 5 mm>P≥4 mm;

A is in a range from 0.27 mm to 0.41 mm when 6 mm>P≥5 mm; and

A is in a range from 0.33 mm to 0.49 mm when 7 mm>P≥6 mm.

15. A method of manufacturing a touch substrate, comprising:

forming a plurality of first electrode chains spaced apart from one another and a plurality of second electrode chains spaced apart from one another on a base substrate, each first electrode chain comprising a plurality of first electrodes, each second electrode chain comprising a plurality of second electrodes, the plurality of second electrode chains and the plurality of first electrode chains being arranged to cross each other, the first electrodes and the second electrodes being electrically insulated from each other, and gaps being formed between adjacent first and second electrodes, the first electrodes being drive electrodes and the second electrodes being sensing electrodes;

forming a first conductor structure within each gap from a conductive material such that the first conductor structure is electrically insulated from the first and second electrodes; and forming a second conductor structure from a conductive material in a central region of a corresponding sensing electrode such that the second conductor structure is electrically insulated from the corresponding sensing electrode.

16. The method according to claim 15, wherein the first electrode chains, the second electrode chains and the first conductor structures are formed at the same time.

17. The method according to claim 16, wherein forming the first electrode chains, the second electrode chains and the first conductor structures at the same time comprises:

forming a first conductive material layer on the base substrate;

patterning the first conductive material layer to form a pattern including the first electrode chains, the second electrode chains and the first conductor structures, such that the plurality of first electrodes of each first electrode chain are electrically connected with one another successively;

forming an insulating layer covering the pattern on the base substrate;

forming through holes corresponding to each second electrode respectively in the insulating layer; and forming a second conductive material layer on the insulating layer such that the through holes are filled with the second conductive material layer, and patterning the second conductive material layer to form bridging structures each electrically connecting two adjacent second electrodes of one second electrode chain, such that the plurality of second electrodes of each second electrode chain are electrically connected with one another successively.

18. The method according to claim 15, wherein shapes of adjacent second conductor structures are formed to be different from each other.

* * * * *